Patented Mar. 15, 1949

2,464,399

UNITED STATES PATENT OFFICE 2,464,399

MANUFACTURING TETRAETHYL LEAD

Willis Jackson Clem, Wilmington, Del., assignor to E. I. du Pont de Nemours & Company, Wilmington, Del., a corporation of Delaware No Drawing. Application April 10, 1946, Serial No. 661,067

7 Claims. (Cl. 260—437)

This invention relates to a process for manufacturing tetraethyl lead and more particularly to catalyzing the ethylation of lead monosodium alloy with ethyl chloride.

In the usual commercial process for manufacturing tetraethyl lead, ethyl chloride is reacted with lead monosodium alloy in a closed vessel under pressure at about 65° C. to about 85° C. This process ordinarily requires 5 or more hours to complete the reaction. In recent years, it has become important to very greatly increase the production of tetraethyl lead. In order to increase such production materially, it has become important and desirable to greatly decrease the time for carrying the reaction to completion. When it has been attempted to decrease the time of reaction in the old processes, the yield of tetraethyl lead from a given batch of alloy has been materially decreased and additional and difficult problems of separating the tetraethyl lead from the reaction mass have been encountered.

An object of the present invention is to provide a process whereby the speed of the reaction is materially increased without a substantial decrease in the yield. Another object is to provide a process whereby the time for completion of the reaction may be greatly decreased with a resulting large increase in the production of tetraethyl lead. A further object is to provide new and improved catalysts for the reaction of ethyl chloride with lead monosodium alloy. Other objects are to advance the art. Still other objects will appear hereinafter.

The above and other objects may be accomplished in accordance with my invention which comprises carrying out the reaction of ethyl chloride on lead monosodium alloy, in the presence of a small proportion, sufficient to accelerate the reaction, of an amide of a carboxylic acid, which amide contains from 1 to 2 amide groups and which consists of carbon, hydrogen, oxygen, nitrogen and 0 to 2 halogen atoms, the oxygen being amide, alcoholic and ethereal oxygen solely and the nitrogen being amide nitrogen solely. I have found that such amides are extremely effective catalysts for this reaction, increasing the speed of the reaction to such an extent that the time, required for completion of the reaction, is reduced to about one hour. At the same time, high yields of tetraethyl lead are obtained and the difficulty of separating the tetraethyl lead from the reaction mass is not increased. Thereby, the production of tetraethyl lead in a plant is very materially speeded and increased.

I have found that the members of the above defined class of amides are, as a whole, very effective for accelerating the reaction. The carboxylic acid may be aromatic, alicyclic or acyclic. Preferably, the carboxylic acid is aliphatic.

The term "aliphatic" as employed herein is employed in the strict sense to mean an open chain and to exclude aromatic and like substituents. The amides may be saturated or unsaturated and may contain halogen, alcoholic hydroxy and ether groups as substituents. The term "a carboxylic acid" will include both mono- and dicarboxylic acids. The term "amide oxygen" will be understood to mean the oxygen atoms which form the amide group. The term "alcoholic oxygen" will be understood to mean the oxygen of an alcoholic hydroxyl group. The term "ethereal oxygen" will be understood to mean the oxygen of an ether group. The term "amide group" will be understood to mean the group

in which the free valences are satisfied by H or C atoms. Preferably, the oxygen in the amides will be amide oxygen solely.

Amides which have been found to be effective to accelerate this reaction are as follows:

Acetamide
Chloroacetamide
Dichloroacetamide
Propionamide
Butyramide
Oxamide
Caproamide
Acetanilide
o-Chloroacetanilide
Benzamide The amount of the amide employed may be varied widely and will depend upon the conditions employed and particularly on the size of the batches and the equipment. Generally, they will be employed in the proportion of from about 0.2% to about 1.8%, based on the ethyl chloride. In large scale plant production in an autoclave, smaller proportions of the amides will usually be effective and may even be desirable.

While the amide may be added to the reactants or to the reaction vessel in any desired manner and at any desired stage of the process, it will generally be most desirable to add the amide to the ethyl chloride prior to mixing the ethyl chloride with the alloy. The process of making tetraethyl lead will remain unchanged, except for the addition of the amide and the shorter time required for the completion of the process.

In order to more clearly illustrate my invention, preferred modes of carrying the same into effect and the advantageous results to be obtained thereby, the following example is given:

*Example*

Approximately 100 g. of lead-sodium alloy (containing 10.0% sodium) of a size which passed a 4 mesh screen and was retained on a 10 mesh screen, was charged into each of a number of steel bombs having a capacity of 150 ml. Fifty milliliters of ethyl chloride was added to each bomb and different amounts of amide was added to some of them. The bombs were closed and tumbled in a water-bath maintained at 85° C. for 90 minutes. After the heating period, the hot water was drained and the bath was refilled with cold water. After 15 minutes, the bombs were removed and placed on ice. Each reaction mass was extracted with 2000 ml. of benzene. A 50 ml. aliquot of the benzene solution was titrated with iodine solution to determine the yield of tetraethyl lead.

The results are shown in the following table in which the figures under "Average yield" represent the average of two to three determinations:

*Table*

| Accelerator | Amount | Average Yield |
| --- | --- | --- |
|  | Grams | Per cent |
| Acetamide | 0.1 | 82.9 |
| Do | 0.3 | 84.4 |
| Do | 0.5 | 88.3 |
| None (control) |  | 75.7 |
| Acetanilide | 0.4 | 90.1 |
| Do | 0.6 | 90.7 |
| Do | 0.8 | 89.1 |
| None (control) |  | 78.8 |

It will be understood that my invention is not to be limited to the specific embodiments disclosed, but that my invention may be modified in various respects without departing from the spirit or scope thereof. For example, other amides of carboxylic acids within the class hereinbefore defined may be substituted for those specifically disclosed herein.

I claim:

1. In the process of making tetraethyl lead by the reaction of ethyl chloride on lead monosodium alloy, the improvement which comprises carrying out the reaction in the presence of a small proportion, sufficient to accelerate the reaction, of an amide of a carboxylic acid of the class consisting of amides which contain 1 to 2 amide groups and consist of carbon, hydrogen, oxygen and nitrogen, the oxygen being amide, alcoholic and ethereal oxygen solely and the nitrogen being amide nitrogen solely and corresponding amides containing 1 to 2 halogen atoms attached to carbon.

2. In the process of making tetraethyl lead by the reaction of ethyl chloride on lead monosodium alloy, the improvement which comprises carrying out the reaction in the presence of a small proportion, sufficient to accelerate the reaction, of an amide of a carboxylic acid, which amide contains from 1 to 2 amide groups and which, except for the O and N of the amide group, consists of carbon and hydrogen.

3. In the process of making tetraethyl lead by the reaction of ethyl chloride on lead monosodium alloy, the improvement which comprises carrying out the reaction in the presence of a small proportion, sufficient to accelerate the reaction, of an amide of an aliphatic carboxylic acid, which amide contains from 1 to 2 amide groups and which, except for the O and N of the amide group, consists of carbon and hydrogen.

4. In the process of making tetraethyl lead by the reaction of ethyl chloride on lead monosodium alloy, the improvement which comprises carrying out the reaction in the presence of a small proportion, sufficient to accelerate the reaction, of an amide of a carboxylic acid, which amide contains a single amide group and which, except for the O and N of the amide group, consists of carbon and hydrogen.

5. In the process of making tetraethyl lead by the reaction of ethyl chloride on lead monosodium alloy, the improvement which comprises carrying out the reaction in the presence of a small proportion, sufficient to accelerate the reaction, of an amide of an aliphatic carboxylic acid, which amide contains a single amide group and which, except for the O and N of the amide group, consists of carbon and hydrogen.

6. In the process of making tetraethyl lead by the reaction of ethyl chloride on lead monosodium alloy, the improvement which comprises carrying out the reaction in the presence of a small proportion, sufficient to accelerate the reaction, of acetamide.

7. In the process of making tetraethyl lead by the reaction of ethyl chloride on lead monosodium alloy, the improvement which comprises carrying out the reaction in the presence of a small proportion, sufficient to accelerate the reaction, of acetanilide.

WILLIS JACKSON CLEM.

REFERENCES CITED

The following references are of record in the file of this patent:

UNITED STATES PATENTS

| Number | Name | Date |
| --- | --- | --- |
| 1,622,228 | Midgley | Mar. 22, 1927 |
| 1,717,961 | Daudt et al. | June 18, 1929 |
| 1,749,567 | Daudt | Mar. 4, 1930 |

FOREIGN PATENTS

| Number | Country | Date |
| --- | --- | --- |
| 216,083 | Great Britain | Feb. 16, 1925 |